United States Patent
Hays

Patent Number: 6,122,915
Date of Patent: Sep. 26, 2000

[54] MULTISTAGE TWO-PHASE TURBINE

[75] Inventor: Lance G. Hays, La Crescenta, Calif.

[73] Assignee: Biphase Energy Company, Placentia, Calif.

[21] Appl. No.: 09/303,631

[22] Filed: May 3, 1999

Related U.S. Application Data

[60] Continuation of application No. 08/761,220, Dec. 6, 1996, which is a division of application No. 08/472,657, Jun. 7, 1995, Pat. No. 5,664,420, which is a continuation-in-part of application No. 08/378,733, Jan. 26, 1995, Pat. No. 5,525,034, which is a continuation-in-part of application No. 07/878,605, May 5, 1992, Pat. No. 5,385,446.

[51] Int. Cl.$^7$ ..................................................... F03G 7/00
[52] U.S. Cl. .......................................... 60/641.2; 60/641.5
[58] Field of Search ................................. 60/641.2, 649, 60/651, 641.5, 671; 210/797, 780

[56] References Cited

U.S. PATENT DOCUMENTS

| | | |
|---|---|---|
| 2,531,896 | 11/1950 | Telbizoff . |
| 3,093,080 | 6/1963 | Tarifa et al. . |
| 3,358,451 | 12/1967 | Feldman et al. . |
| 3,749,513 | 7/1973 | Chute . |
| 3,838,668 | 10/1974 | Hays et al. . |
| 3,879,949 | 4/1975 | Hays et al. . |
| 3,936,214 | 2/1976 | Zupanick . |
| 3,972,195 | 8/1976 | Hays et al. . |
| 4,087,261 | 5/1978 | Hays . |
| 4,141,219 | 2/1979 | Elliot . |
| 4,227,373 | 10/1980 | Amend et al. . |
| 4,258,551 | 3/1981 | Ritzi . |
| 4,267,964 | 5/1981 | Williams . |
| 4,298,311 | 11/1981 | Ritzi . |
| 4,336,693 | 6/1982 | Hays et al. . |
| 4,339,923 | 7/1982 | Hays et al. . |
| 4,391,102 | 7/1983 | Studhalter et al. . |
| 4,441,322 | 4/1984 | Ritzi . |
| 4,492,083 | 1/1985 | McCabe et al. ................... 60/641.2 X |
| 4,511,309 | 4/1985 | Maddox . |
| 5,104,554 | 4/1992 | Dempsey ............................... 210/747 |
| 5,220,792 | 6/1993 | Doron et al. ....................... 60/641.2 X |
| 5,385,446 | 1/1995 | Hays . |
| 5,661,977 | 9/1997 | Shnell .................................... 60/641.2 |
| 5,664,420 | 9/1997 | Hays ...................................... 60/641.2 |

FOREIGN PATENT DOCUMENTS

| | | |
|---|---|---|
| 59-122702 | 7/1984 | Japan . |
| 6480701 | 3/1989 | Japan . |

Primary Examiner—Hoang Nguyen
Attorney, Agent, or Firm—William W. Haefliger

[57] ABSTRACT

A multistage two-phase turbine having multiple stages to receive fluid, each stage having an inlet and outlet comprising nozzles at the inlet to each stage to accelerate the fluid that consists of a mixture of gas and liquid, to form two-phase jets; a rotating separator structure to receive and separate the two-phase jets into gas streams and liquid stream in each stage; the turbine having a rotating output shaft, and there being structure to convert the kinetic energy of the liquid streams into shaft power; structure to remove the separated liquid from at least one stage and transfer it to nozzles at the next stage; structure to remove the separated liquid from the last stage and transfer it to primary outlet structure; and structure to remove the separated gas from at least one stage and transfer it to a secondary outlet structure.

19 Claims, 11 Drawing Sheets

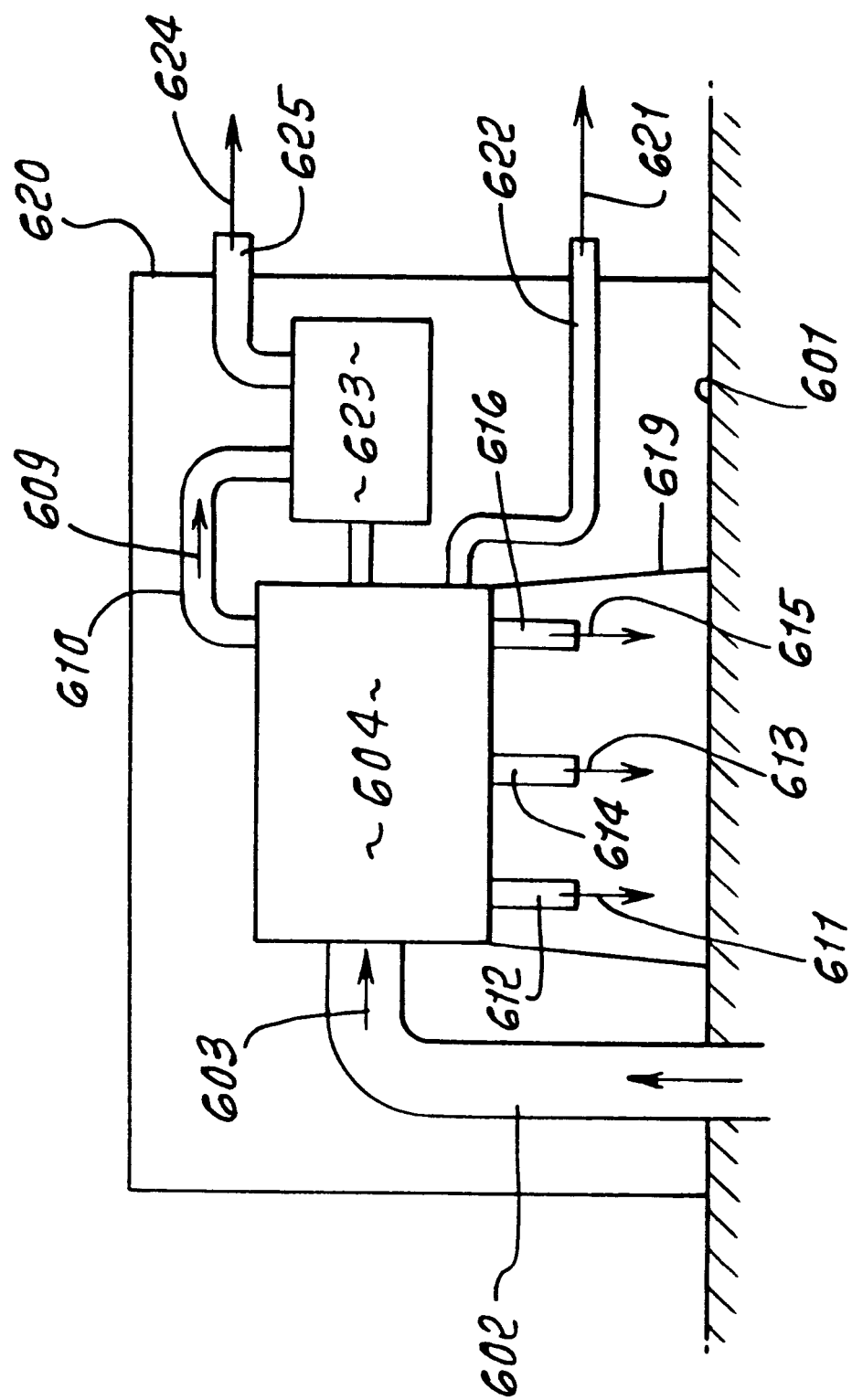

MULTISTAGE TWO-PHASE TURBINE

This application is a continuation of prior U.S. application Ser. No. 08/761,220 filed Dec. 6, 1996, now pending, which is a divisional of prior U.S. Ser. No. 08/472,657 filed Jun. 7, 1995, now U.S. Pat. No. 5,664,420, which is a continuation in part of prior U.S. application Ser. No. 08/378,733 filed Jan. 26, 1995 now U.S. Pat. No. 5,525,034, which is a continuation in part of prior U.S. application Ser. No. 07/878,605 filed May 5, 1992 now U.S. Pat. No. 5,385,446.

BACKGROUND OF THE INVENTION

This invention relates generally to two-phase turbines, and more particularly to an improved multistage, single rotor turbine driven by an input mixture of gas and liquid, and capable of generating shaft power, while simultaneously separating the gas and liquid phase components in one or more expansions, and also increasing the pressure of the separated liquid phase component.

There is need for an improved two-phase turbine having the above multistage characteristics. There is need for improved processes in which such a turbine is employed.

SUMMARY OF THE INVENTION

It is a major object of the invention to provide an improved turbine structure and processes in which it is employed meeting the above needs. Basically, the improved multistage two-phase turbine has one or more stages to receive fluid, each stage having an inlet and an outlet, and comprises:

a) nozzles at the inlet to each stage to accelerate the fluid that consists of a mixture of gas and liquid, to form two-phase jets, b) a rotating separator structure to receive and separate the two-phase jets into gas streams and liquid streams in each stage, c) the turbine having a rotating output shaft, and there being means to convert the kinetic energy of the liquid streams into shaft power, d) means to remove the separated liquid from at least one stage and transfer it to nozzles at the next stage, e) means to remove the separated liquid from the last stage and transfer it to primary outlet structure, f) means to remove the separated gas from each stage and transfer it to secondary outlet structure or optionally, g) means to remove the separated gas from each stage and transfer it to the nozzles at the next stage.

It is another object to provide such a turbine, and including means in at least one stage to convert the kinetic energy of the gas stream to shaft power. Means may also be employed in at least one stage to recover the kinetic energy of the separated liquid stream as pressure.

Another object is to provide turbine axial flow blades associated with at least one rotating separator structure to convert the gas stream kinetic energy to shaft power.

A further object includes the provision of means separating the stages wherein the nozzles are an integral part of the means.

Yet another object includes the provision of means to separate two components of the separated liquid stream from at least one stage, and to separately remove each liquid component from the stage. In this regard, a diffuser may be positioned to remove the heavier of two liquid components from at least one stage, or a liquid stream receiving nozzle may be employed to remove the heavier of two liquid components from at least one stage. Additionally, structure may be provided to coalesce a dispersed liquid component into a continuous phase in the rotating separator structure of at least one stage.

The improved turbine may be used in a process requiring one or more successive reductions in pressure of a mixture of steam and brine flowing from a geothermal well. The referenced turbine produces power, while separating the steam, so that it can be utilized at lower pressures in a conventional steam turbine. The separated brine pressure can be increased such that it can be re-injected into the ground with no pump.

The turbine can also be used in a process involving combined liquid and gas flows require several successive reductions in pressure with separation at each succeeding pressure level. One example is the production of oil and gas from a high pressure well. The two-phase flow is flashed at several pressures, each lower than the preceding pressure. At each flash the gas is separated from the liquid, so that it can be recompressed. The separated liquid is subsequently flashed to a lower pressure and the evolved gas again separated.

The turbine can also be utilized in a process requiring multiple two-phase flashes in the conversion of waste heat from a prime mover to useful power. In this regard, if a liquid is heated and flashed several times to produce vapor at several pressures to operate a multiple pressure vapor turbine, a more efficient conversion of the waste heat to power is possible.

These and other objects and advantages of the invention, as well as the details of an illustrative embodiment, will be more fully understood from the following specification and drawings, in which:

DRAWING DESCRIPTION

FIG. 7a is a fragmentary section showing details of a rotor with a diffuser for water;

FIG. 7b is a fragmentary section showing details of a rotor with a liquid nozzle for water;

Figure 10:
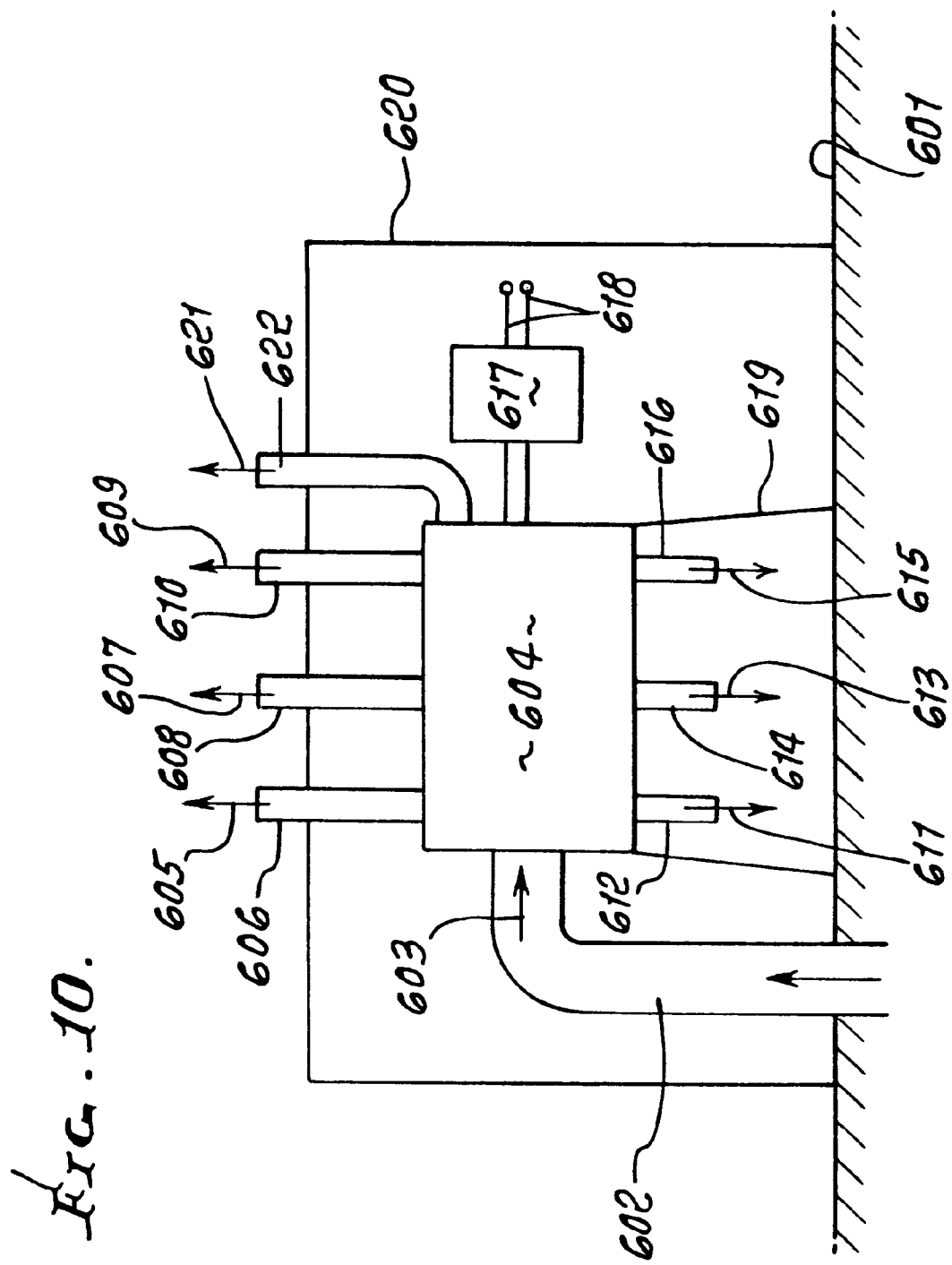

FIG. 10 is a system block diagram showing a multistage, or single stage, two-phase turbine installed on the sea floor, producing separated gas, oil and water streams and power from an oil and gas well; and FIG. 11 is a system block diagram showing a multistage, or single stage, two-phase turbine installed on the sea floor, producing separated gas, oil, and water streams from an oil and gas well, and driving a gas compressor to produce high-pressure gas.

DETAILED DESCRIPTION

A single rotor turbine has previously been developed to generate power from a mixture of gas and liquid, while simultaneously separating the gas from the liquid and increasing the pressure of the separated liquid phase. This turbine produces power from a single reduction in pressure of the mixture of gas and liquid.

Figure 1:
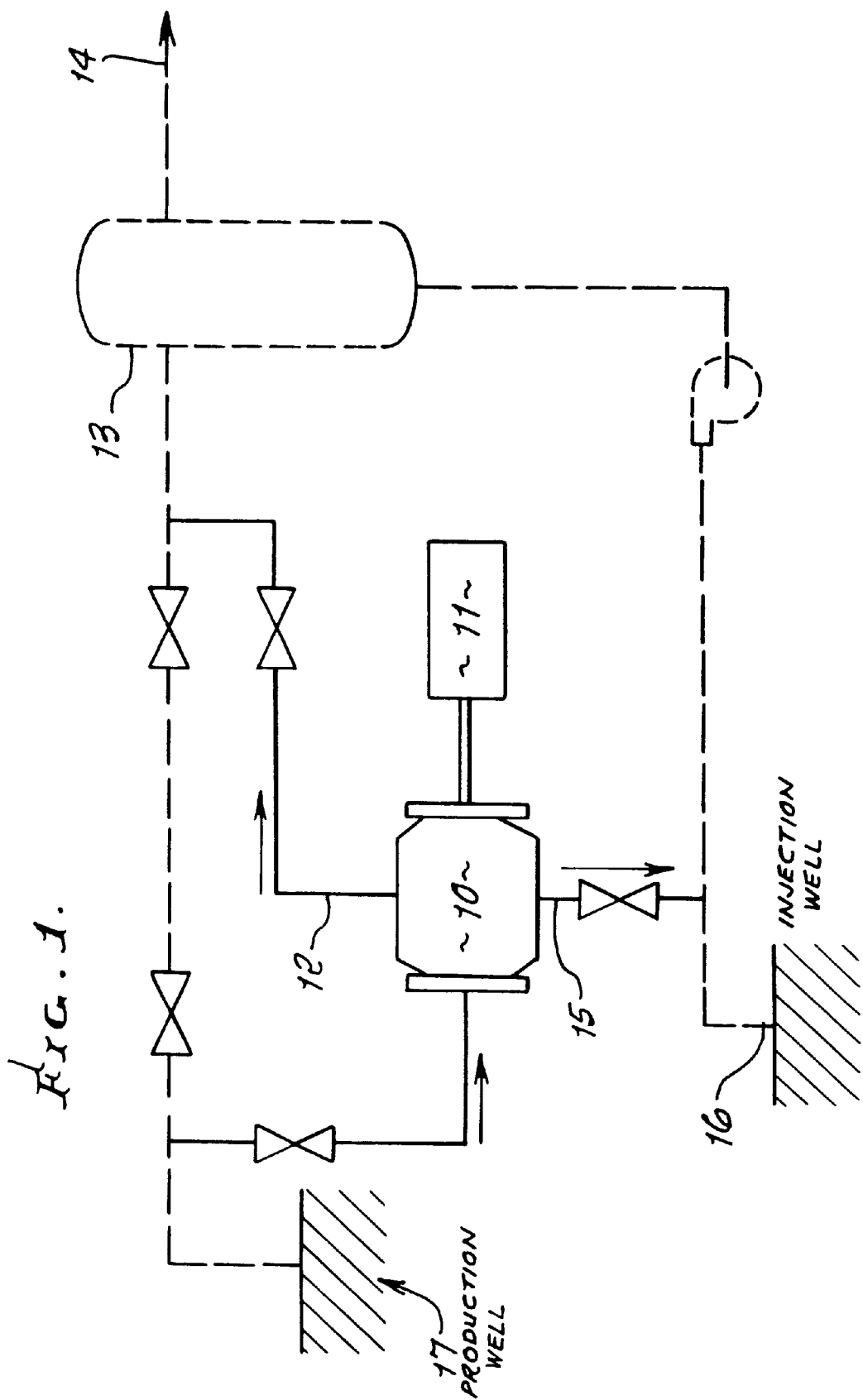
FIG. 1 is a system block diagram showing use of a two-phase turbine in generation of power from geothermal fluids.

An example is the reduction of pressure of a mixture of steam and brine flowing from a geothermal well, as seen in FIG. 1. The referenced turbine 10 drives a generator 11 to produce power, while separating the steam, so that it can be utilized at a lower pressure in a conventional steam turbine. See steam flow at 12 to a flash tank 13, and steam flow at 14, to the steam turbine. The pressure of separated brine at 15 can be increased such that it can be re-injected into the ground at 16 with no pump. The geothermal wall is seen at 17.

Figure 2:
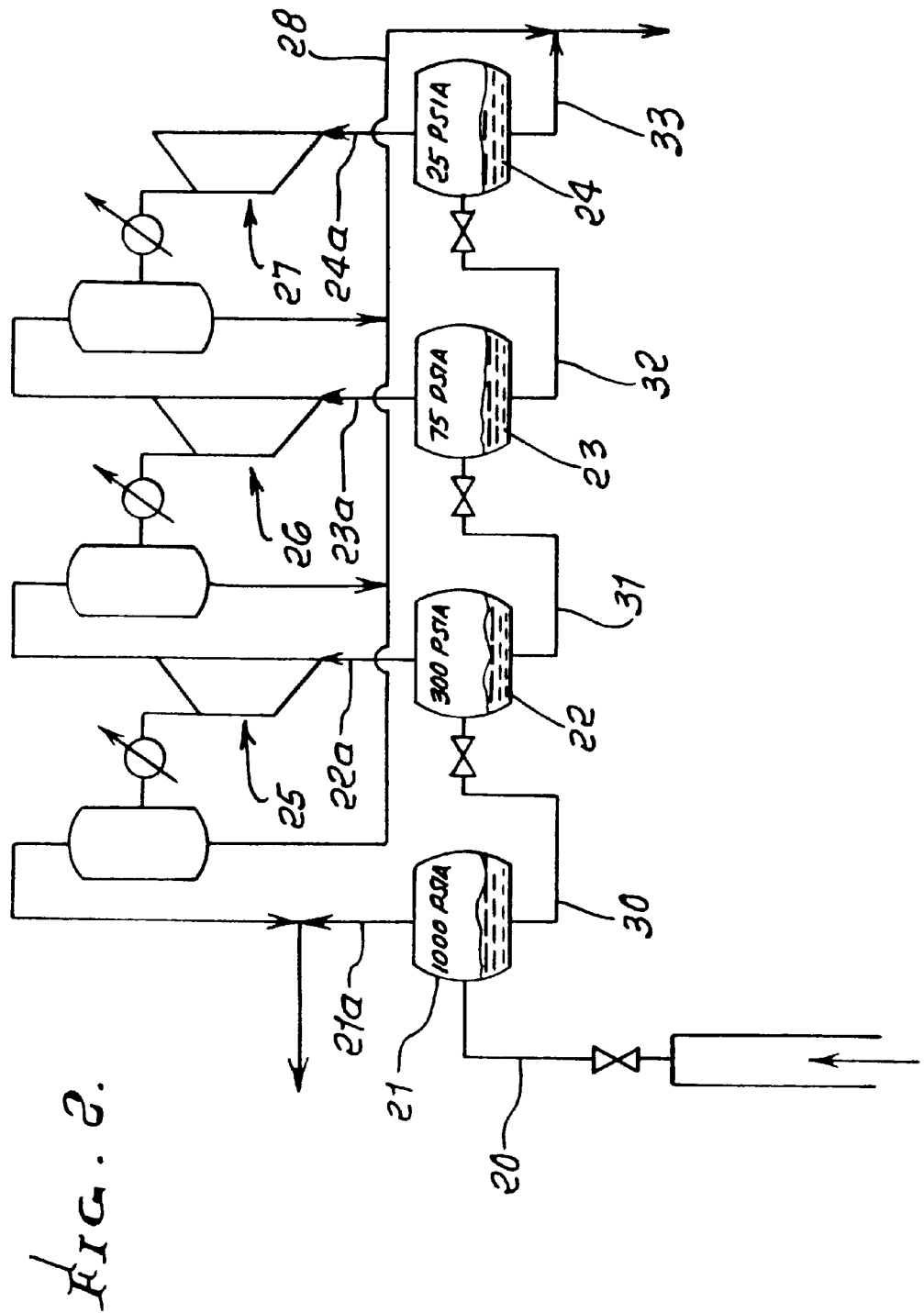
FIG. 2 is a system block diagram showing a high production oil/gas process with four stages of pressure reduction.

Some processes involving combined liquid and gas flows require several successive reductions in pressure with separation at each succeeding pressure level. One example, as seen in FIG. 2, is the production of oil and gas from a high pressure well. The two-phase flow at 20 is flashed at several pressures, noted at 21–24, each lower than the preceding pressure. At each flash, the gas is separated from the liquid, so that it can be recompressed. See gas discharges at 21a to 24a connected to recompression stages 25 to 27 discharging at 28. The separated liquid is subsequently flashed to a lower pressure, and the evolved gas again separated. See liquid lines 30–33.

Figure 3:
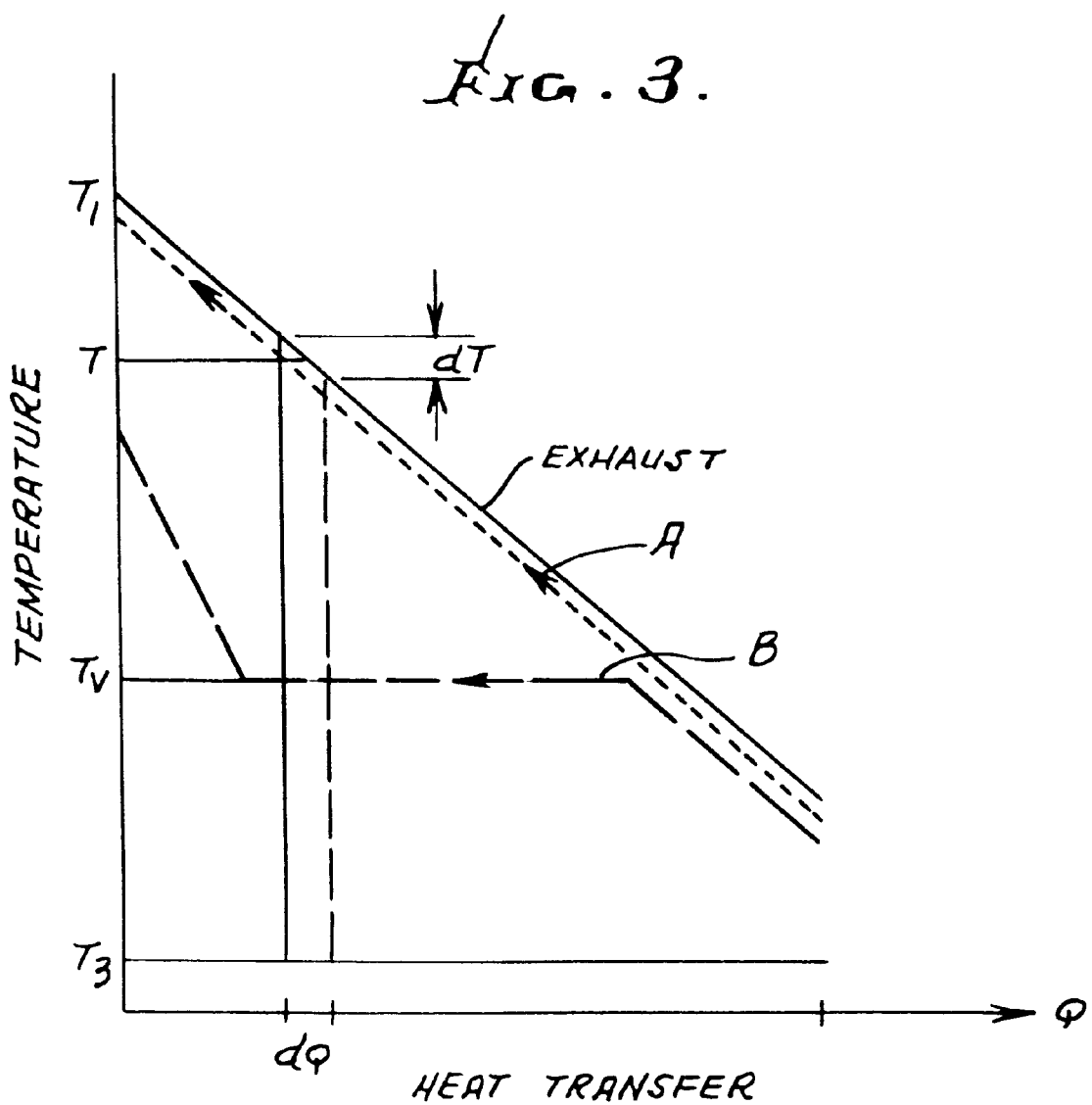
FIG. 3 is a graph of heat transfer vs. temperature, waste heat bottoming cycles.

Another process requiring multiple two-phase flashes is the conversion of waste heat from a prime mover to useful power. FIG. 3 shows the transfer of heat from an exhaust stream into a vaporizing fluid (curve A). The constant temperature region of the vaporizing fluid means the energy conversion efficiency at each point (for example $T_v$) is much lower than the efficiency which could be attained if energy conversion occurred at the exhaust temperature T. The Carnot efficiency, $\eta_c$, for converting the element of heat, dQ, to power is $\eta_c=1-T_3/T_v$ for the vapor bottoming cycle of FIG. 3. The Carnot efficiency for a cycle operating at the hot gas temperature, T, is $\eta_c=1-T_3/T$. If liquid is heated (curve B) and flashed several times to produce vapor at several pressures to operate a multiple pressure vapor turbine, a more efficient conversion of the waste heat to power is possible.

Figure 4:
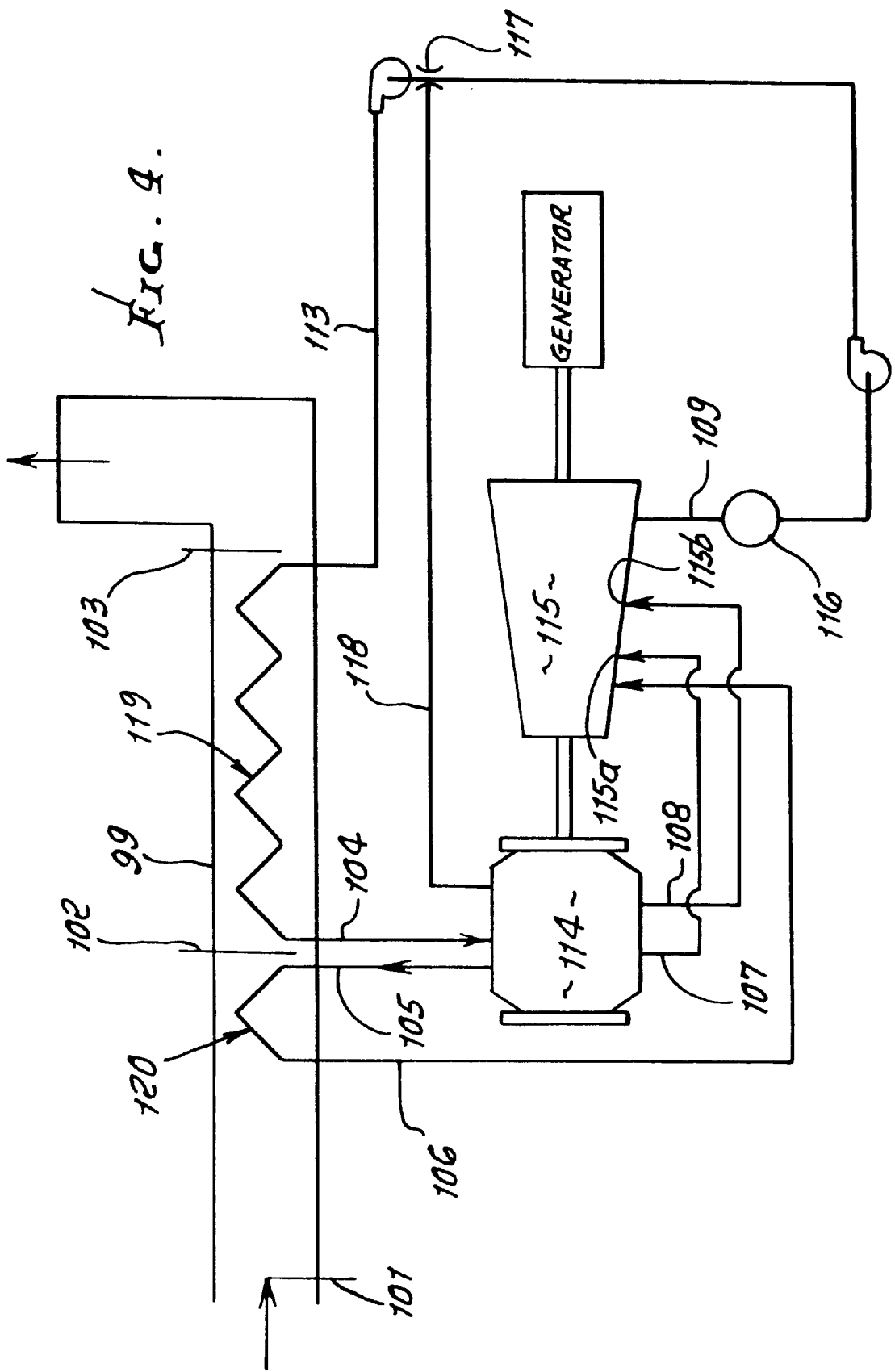
FIG. 4 is a system block diagram showing coupling of a multistage two-phase turbine with a steam turbine and generator.

FIG. 4 shows a power cycle, which operates on this principle. Liquid is heated in flowing from 113 to 104 in a heat exchanger 119 by heat from an exhaust steam at 102 to 103 in duct 99. The liquid is flashed to a lower pressure at 105 in a multistage two-phase turbine 114 (to be described later). The vapor from the turbine flows through a superheater 120 and is heated to a higher temperature at 106. The vapor is then ducted to the inlet of a vapor turbine 115.

The separated liquid at pressure within the multistage two-phase turbine is flashed to a lower pressure at 107. The vapor is separated at pressure 107 and is ducted to an induction port 115a of the vapor turbine 115. The separated liquid is flashed within the multistage two-phase turbine to a yet lower pressure at 108. The vapor is separated at pressure 108 and is ducted to another induction port 115b of the vapor turbine.

The mixed vapor flows within the vapor turbine 115 are expanded to an outlet pressure at 109. The vapor flows are condensed in a condenser 116 and pumped to a mixer 117.

The separated liquid at 108 is internally pressurized and delivered at 118, and flows to the mixer 117 where it is mixed with the condensed vapors. The resulting liquid flow is pumped back to the liquid heat exchanger 119.

For some applications, the liquid heat exchanger 119 may be used to produce a mixture of heated liquid and vapor at 104, which is ducted to the multistage two-phase turbine 114 and flashed to lower pressure at 105.

Figure 5:
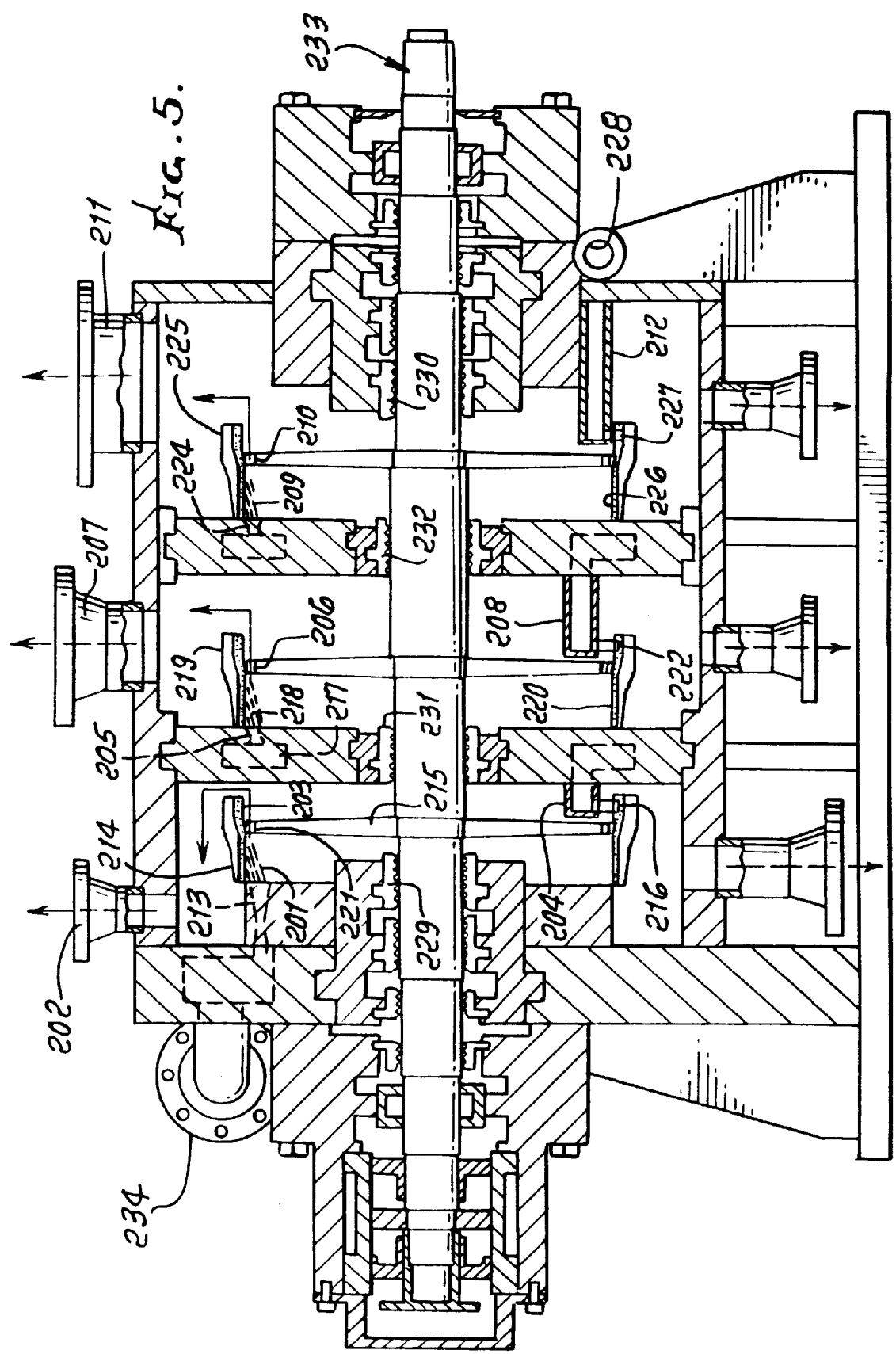
FIG. 5 is an axial cross section taken through a multistage two-phase turbine.

The multistage two-phase turbine utilized in the power cycle shown in FIG. 4 is seen in FIG. 5. A gas and liquid mixture, or flashing liquid, is introduced through a port 234, to nozzles 213. The pressure is reduced in the nozzles, accelerating the gas and liquid mixture, to form high-velocity, two-phase jets at 201. The jets impinge onto a rotating separator member 214 of a multistage rotor 215 separating the liquid into a liquid layer 203.

If the tangential jet velocity is greater than the circumferential velocity of the rotating separator member 214, the liquid velocity is reduced by frictional coupling to the member, and power is transferred to the rotor. If the tangential velocity is less, the liquid velocity is increased by frictional coupling to the member, and power is transferred from the rotor. This mechanism provides a method for producing power from high velocity jets in one stage of the rotor, to be used to increase the liquid velocity in another stage of the rotor, where the jet velocity may be lower.

The separated gas flows through gas blading 221 to the first exit port 202. The axial gas blading shown converts the gas kinetic energy to power of the rotor.

The separated liquid from the first rotating separator flows into a scoop 216 and is transferred through a pipe 204 and passage 217 in the diaphragm between the first and second stage to nozzles 205. The pressure is lowered in the nozzles to the pressure in the next stage. High velocity two-phase jets 218 are formed, which impinge on the second stage separator rotor 219. The separated liquid forms a layer 220. The separated gas flows through gas blades 206, transferring power to the rotor, and subsequently out the second stage port 207.

The separated liquid from the second rotating separator flows into a scoop 222 and is fed by a pipe 208 into a passage in the diaphragm between the second and third stage. The passage feeds the liquid into nozzles 224, where it is flashed to the pressure in the third stage forming high velocity jets 209. The two-phase jets impinge on the third stage separator rotor 225. The liquid separates, forming a layer 226. The separated gas flows through gas blades 210, transferring power to the rotor. The gas then leaves through the third stage port 211.

The separated liquid flows into a scoop 227, which may be contoured to slow the liquid to a lower velocity than the entering velocity, effecting a pressure increase. The liquid is ducted through a pipe 212 to the liquid exit port 218.

The rotating structure 215, shaft 233, and separator rotors 214, 219, and 225 are fixed together, and all rotate as one body at the same speed. Seals 229 and 230 are provided at each end to seal the gas from leaking. Seals 231 and 232 are provided in each diaphragm to seal the gas from leaking from a stage at high pressure to one at lower pressure.

Figure 6:
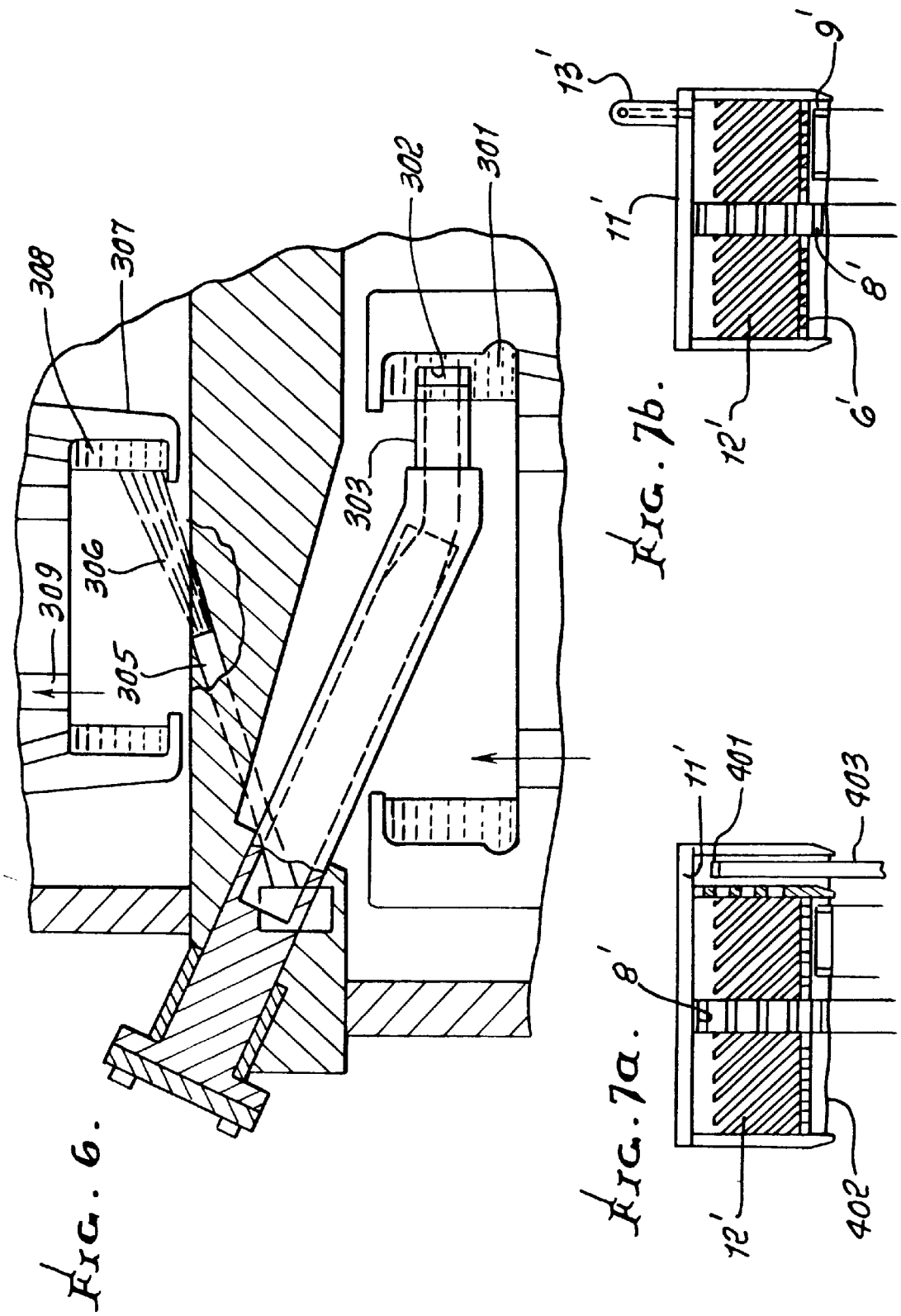
FIG. 6 is a cross section taken through diffuser and nozzle structure of a multistage two-phase turbine.

A detail of a scoop or diffuser arrangement is shown in FIG. 6. The separated liquid layer 301 enters the scoop 302. The scoop structure 303 may feature a diverging area, in which case the liquid velocity is slowed to a lower value than the entering value at 302.

The liquid enters a passage 304 and flows to a nozzle 305, which is interconnected to the passage. The pressure is reduced in the nozzle, causing the liquid to flash and form a two-phase jet at 306. The two-phase jet impinges on the rotating separator surface 307 of the next stage, forming a liquid layer 308. The separated gas flows through gas blades 309.

Figure 7:
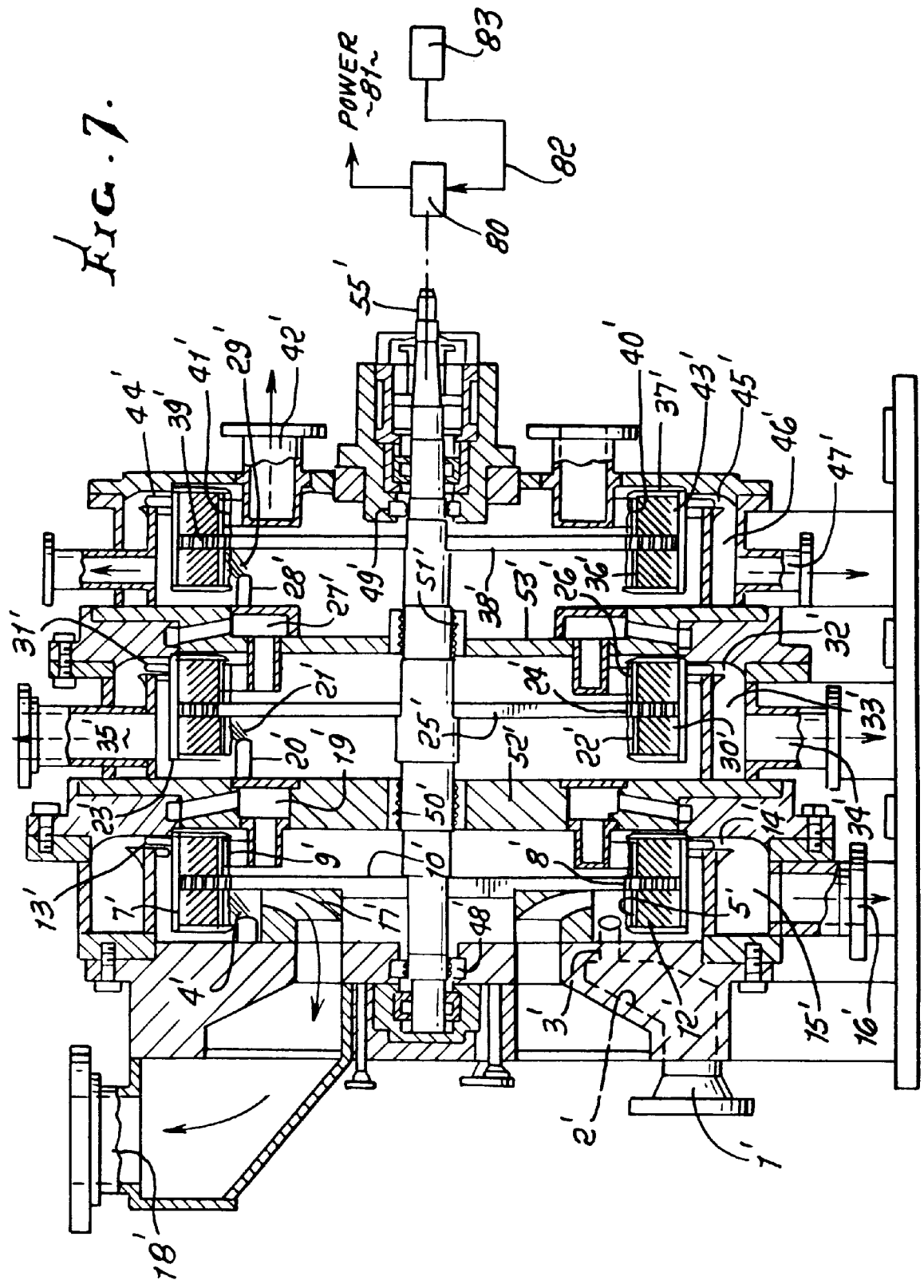
FIG. 7 is an axial cross section taken through a multistage two-phase turbine characterized by processing of two separated liquid stream components.

The complex oil and gas process shown in FIG. 2 may be replaced by a single multistage two-phase turbine shown in FIG. 7, simplifying and greatly reducing the size of needed apparatus.

A high-pressure mixture of oil, gas, and water is introduced to the unit through inlet ports (1)'. The mixture flows through passages (2)' to two-phase nozzles (3)'.

The pressure is reduced in the nozzles, causing the mixture to be accelerated and additional light components in the oil to vaporize. Two-phase jets (4)' are formed. The jets impinge on the rotating surface of the first stage rotating separator surface (5)'. Energy transfer occurs, as described in FIG. 5.

The liquid forms a layer of oil and water. The oil, which is lighter, forms a layer on the surface and flows through passages (8)' to the opposite side of the supporting disc (10)'. The oil is collected by a scoop (9)' which is submerged in the oil layer.

The water, which has a higher density than the oil, is centrifuged to the outer part (7)' of the rotating separator (11)'. A coalescing structure (12)' may be provided to assist the separation of the water from the oil. The water, at high pressure, due to the centrifugal force, expands through liquid nozzles (13)', flowing through passages (14)' to an annulus (15)'. The water flows from the turbine through an outlet port (16)'. The reaction forces from the water jets leaving the nozzles (13)' transfer power to the rotor.

Another method of removing the separated water is shown in FIG. 7a. A diffuser 401 is wholly submerged in the water layer 402. The water flows out the tube 403 at a rate controlled by the inlet size and a throttling valve. This method may be used for any stage.

Referring back to FIG. 7, the separated gas flows through gas blades (17)', which may be radial inflow as shown, or axial flow, and leaves the turbine through an exit port (18)'. Kinetic energy and pressure in the gas is converted to power in the rotor by the gas blades.

The separated oil from the first stage flows from the diffuser (9)' into passages (19)', which carry the flow to two-phase nozzles (20)'. The flow is flashed to the pressure of the second stage in the nozzles, causing additional light components of the oil to vaporize, forming two-phase jets (21)'. The jets impinge on the surface (22)' of the second rotating separator structure (23)' forming a layer of oil. The oil flows to the opposite side of the supporting disc (25)' through passages (24)'. The oil enters the inlet of a diffuser (26)' immersed in the oil layer. The oil flows into passages (27)', which feed nozzles (28)'.

Water, which may still be entrained in the oil, is centrifuged to the outer part (30)' of the second stage rotating separator. The water at high pressure is expanded through liquid nozzles (31)' and flows through passages (32)' to a volute (33)'. The separated water subsequently flows through the turbine through the second stage water exit port (34)'. The separated gas flows from the turbine through the second stage gas exit port (35)'.

The oil from the second stage is expanded to the third stage pressure in the third stage nozzles (28)'. Remaining light components in the oil flash, forming two-phase jets (29)'.

The jets impinge on the surface (36)' of the third rotating separator structure (37)' forming a layer of oil. The oil flows to the opposite side of the supporting disc (38)' through passages (39)'. The oil enters the inlet of a diffuser (40)' immersed in the oil layer. The oil is pressurized by slowing the inlet velocity in the diffuser structure (41)'. The pressurized oil leaves the turbine through the oil exit ports (42)'.

Water, which may still be entrained in the oil, is centrifuged to the outer part (43)' of the third stage rotating separator. The water at high pressure is expanded through liquid nozzles (44)' and flows through passages (45)' to a volute (46)'. The separated water subsequently flows through the turbine through the second stage water exit port (47)'. The separated gas flows from the turbine through the third stage gas exit port (54)'.

The multistage two-phase turbine for oil, gas and water has seals (48)' and (49)' on each end of the shaft (55)' to prevent gas from leaking from the casing. The unit has seals (50)' and (51)' in the diaphragms (52)' and (53)' between stages to reduce gas leakage from a high pressure stage to a lower pressure stage.

Power is transferred to the rotor by the liquid for stages where the two-phase nozzle jet (4)', (21)' and (29)' tangential velocity is greater than the circumferential velocity of the separator surface (6)', (22)' and (36)', and from the separated gas energy in at least the first stage. Power is transferred from the rotor to the liquid, if the tangential velocity of any stage is less than the circumferential velocity of the separator surface.

An induction generator can be connected to the shaft (55)'. See generator 80. If there is a net power transfer to the rotor from the states, power will be generated at 81. If not, the generator will require power input at 82, and will be operated as a motor to maintain the desired circumferential velocity. A power input control is seen at 83.

Figure 8:
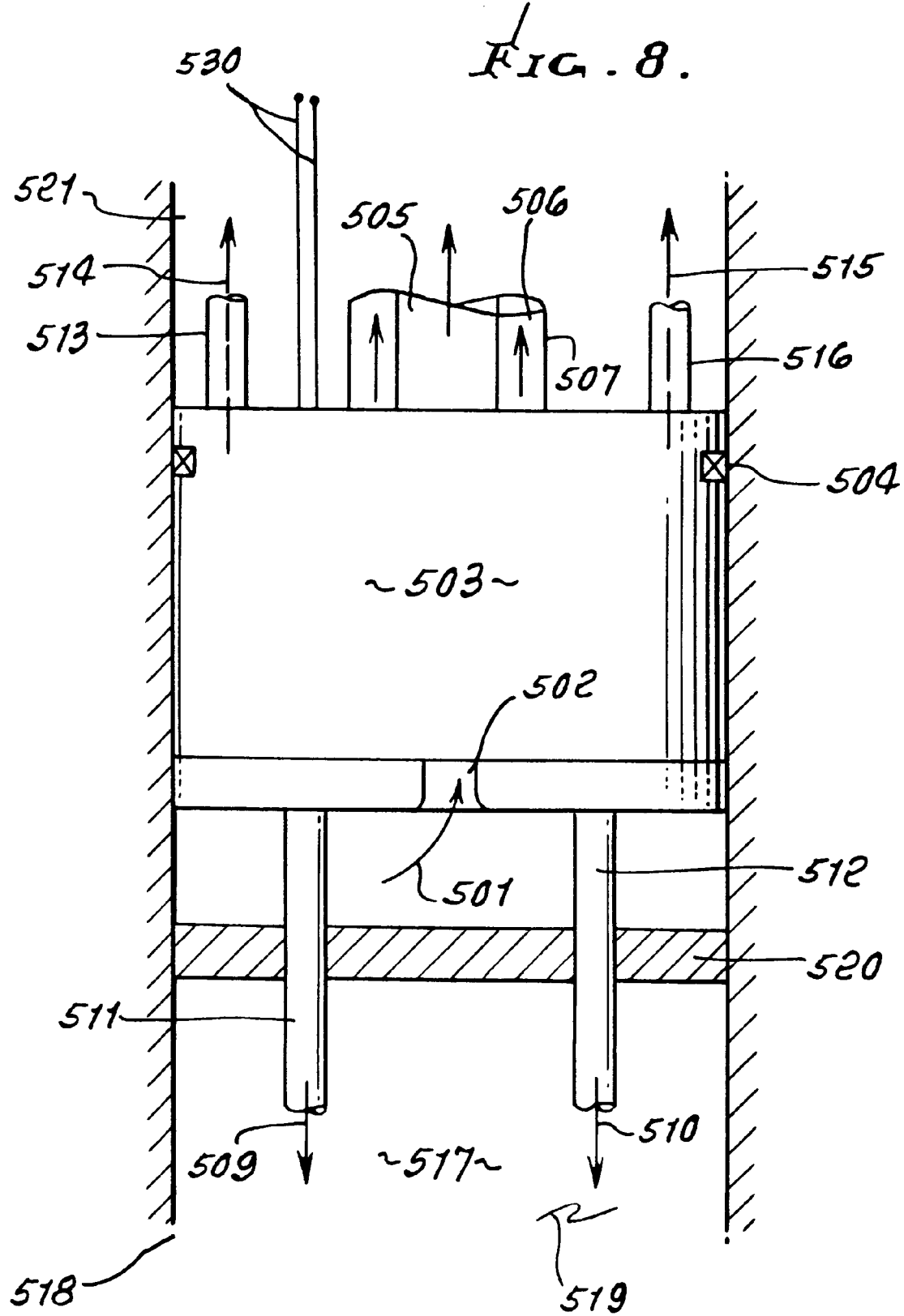
FIG. 8 is a partial axial cross section taken through the installation of a multistage, or single stage, two-phase turbine in the bore of an oil and gas well, such that separated water is injected into another part of the field.

In FIG. 8, a rotary separator turbine 503 is installed in the bore of a gas or oil well 517. Two-phase flow consisting of gas and oil and/or water at 501 flows into the rotary separator turbine through entrance ports 502. The flow is expanded and separated in one or more stages, as shown in FIGS. 5 and 7.

Separated water and other liquids 509 and 510 for a two-stage unit are discharged through pipes 511 and 512 at a pressure higher than the pressure of the entering flow 501. The separated water and liquids may be piped to another part of the strata 518 and discharged at a higher pressure 519 than the pressure of the entering flow 501. The two strata may be separated by a seal 520. The separated oil, if any, at 514 and 515 may be piped to the surface at 513 and 515. Separated gas at 505 and 506 may be piped to the surface at 507. Power generated may be transmitted to the surface through cables 516. The pressure of the two-phase flow 501 can be isolated from the lower pressure region of the well 521 by a seal 504.

Figure 9:
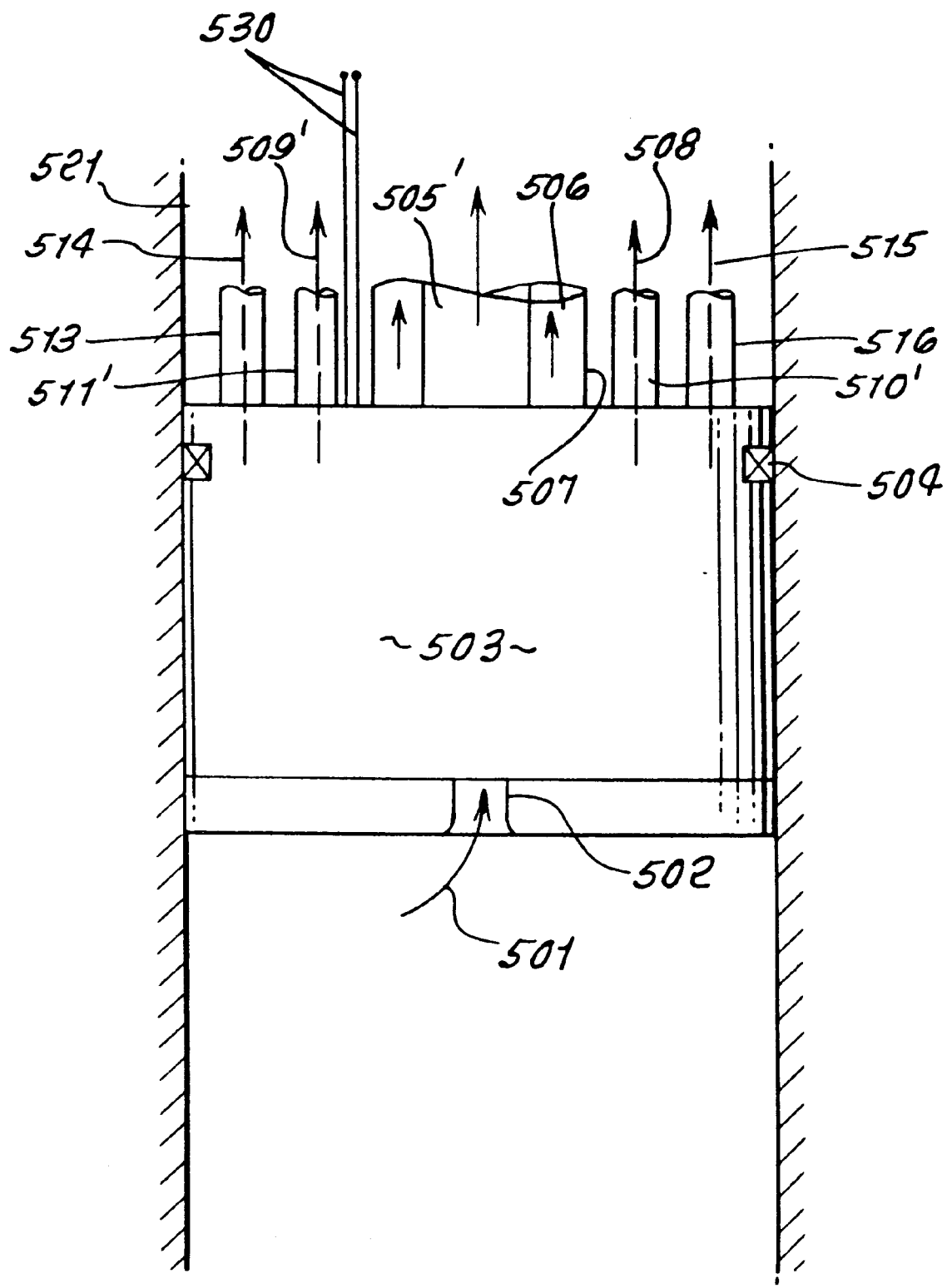
FIG. 9 is a partial axial cross section taken through the installation of a multistage or single stage two-phase turbine in the bore of an oil and gas well, such that separated water is transported to the surface.

In another variation shown in FIG. 9, the separated water at 505' and 509' leave the rotary separator turbine and are piped at 510' and 511' to the surface or another location for disposal.

In FIG. 10, the multistage two-phase turbine 604 is installed on the sea floor 601 within a protective enclosure 620 on a support 619. A mixture of gas and oil and/or water and/or sand 603 flows from a well head 602 into the rotary separator turbine 604. The flow is expanded in one or more stages, as seen in FIG. 7. Separated gas 605, 607, and 609 (for three stages) leave the multistage two-phase turbine and are piped at 606, 608, and 610 to a delivery point or compressor. Separated oil at 621 is piped at 622 to a delivery point.

Separated water and/or solids at 611, 613 and 615 are piped at 612, 614 and 616 for disposal. The multistage two-phase turbine unit may drive a generator 617. The power is transmitted by cables 618 to the surface or to other components within the protective enclosure 620 or elsewhere requiring power.

In FIG. 11, which is similar to FIG. 10, the multistage two-phase turbine drives a gas compressor 623 instead of a generator. The gas flow is expanded internally through each pressure drop. The gas leaving the last stage at 609 flows through external or internal passages 610 to gas compressor 623. The compressor increases the pressure, and the high pressure outlet gas 624 flows through a pipe 625 to a delivery point.

The general method of operation contemplated by the FIG. 8 form of the invention, for processing a multi-component fluid mixture in a sub-surface well, and employing a rotary separator, includes the steps:

a) positioning the separator in the well at a depth to receive the mixture, b) operating the separator to separate and pressurize at least one component of the mixture, c) and flowing the pressurized and separated component lengthwise of the well, away from the separator.

The one component typically consists of one of the following:

i) gas ii) liquid iii) water iv) hydrocarbon gas v) hydrocarbon liquid.

The positioning step may include lowering the separator 503 in the well to the operating depth, as shown; and a pipe string or strings may be lowered in operative relation to the separator, and flowing the separated component upwardly in the pipe string. Such strings may include one or more of the strings shown at 515, 505, 506, 507, and 513. Upper extents of such strings may be considered as constituting one form of lowering means.

The method also contemplates the flowing step to include flowing the component under pressure into the formation in which the well is located.

As referred to above, a rotary separator, usable in the above method, includes nozzle means to accelerate the fluid, to form a two-phase jet, and the operating step includes recovering at least one phase produced by the two-phase jet.

Also, the operating step may include centrifugally pressurizing another phase produced by the jet. The rotary structure in 503 may be considered as advantageously driven by the pressure of the inlet fluid at 501.

The disclosure of the above referenced U.S. patent applications are incorporated herein by reference.

I claim:

1. In the method of processing a multi-component fluid mixture, in a sub-surface well, and wherein a multistage two-phase turbine is provided to have one or more stages to receive fluid, each stage having an inlet and outlet, the steps including a) providing nozzles at the inlet to each stage to accelerate said fluid that consists of a mixture of gas and liquid, to form two-phase jets, b) providing a rotating separator structure in the sub-surface well to receive and separate the two-phase jets into gas streams and liquid streams including water in each stage, there being means operating to remove gas and water streams at the first stage, c) the turbine provided to have a rotating output shaft, and there being means provided to convert the kinetic energy of the liquid streams into shaft power, d) providing means to remove the separated liquid from at least one stage and transfer it to nozzles at the next stage, e) providing means to remove separated liquid including oil from the last stage and transfer it to primary outlet structure, and f) providing means to transfer removed gas to a secondary outlet structure.

2. The method of claim 1 including means in at least one stage converting the kinetic energy of the gas stream to shaft power.

3. The method of claim 1 including means in at least one stage recovering the kinetic energy of the separated liquid stream as pressure.

4. The method of claim 1 including providing turbine axial flow blades associated with at least one rotating separator structure and operated to convert the gas stream kinetic energy to shaft power.

5. The method of claim 1 including providing means separating said stages, wherein the nozzles are provided as an integral part of said means.

6. The method of claim 1 including providing means to separate two components of the separated liquid stream from at least one stage, and to separately remove each said liquid component from the stage.

7. The method of claim 1 wherein said turbine is supported at sub-surface level.

8. The method of claim 1 including removing the separated gas from at least one stage and transferring it to the nozzles at the next stage.

9. The method of claim 6 including providing and operating a diffuser positioned to remove the heavier of two liquid components from at least one stage.

10. The method of claim 6 including providing a liquid stream receiving nozzle to remove the heavier of two liquid components from at least one stage.

11. The combination of claim 6 including providing and operating structure to coalesce a dispersed liquid component into a continuous phase in the rotating separator structure of at least one stage.

12. The method of claim 2 including a) providing and operating a heat exchanger to transfer heat from an auxiliary hot gas stream into fluid that consists of liquid and/or a liquid and vapor mixture, said exchanger having an inlet, b) providing a means to conduct said fluid to the nozzles at least one of said stages, c) providing means to conduct the separated gas stream to a vapor turbine having inlet ports at different pressures, d) providing a condenser, e) providing means to conduct the vapor leaving the vapor turbine to said condenser, which produces condensate, f) providing a pump, g) providing means to conduct said condensate from the condenser to said pump, which operates to produce pressurized liquid, h) providing mixer means, i) providing means to conduct the pressurized liquid from the pump to said mixer means, j) providing means to also conduct said separated liquid stream to said mixer means, which operates to produce a mixed liquid stream, k) and providing and operating means to conduct the mixed liquid stream to said inlet of the heat exchanger.

13. The method of claim 2 including installing the turbine within a gas or oil well.

14. The method of claim 13 wherein separated water is internally pressurized and injected in part of the sub-surface formation different from the producing zone.

15. The method of claim 2 including installing the turbine under the surface of an ocean or sea.

16. The method of claim 15 wherein the multistage two-phase turbine drives a gas compressor, and including operating the compressor to increase the pressure of the separated gas.

17. The method of claim 2 including operating the turbine to receive flow from a geothermal well.

18. In the method of operating apparatus to receive a mixture of gas, oil and water, and to separate same into separate streams, the steps that include:

a) said apparatus provided to have first and second separation stages, b) the first stage having means including two-phase nozzle means separating gas, oil and water into separate streams, and means removing separated gas and water streams from the apparatus, c) the second stage having means including two-phase nozzle means receiving the separated oil stream with water content from the first stage, and separating said water content from the oil, and conducting the separated oil in a secondary oils stream, d) said stages having associated means converting energy of gas, oil and water streams into kinetic energy of rotary means operating at a sub-surface location.

19. The method of claim 18 including:

e) said apparatus provided to have a third separation stage, f) said third stage having means including two-phase nozzle means receiving the separated secondary oil stream with remanent water content from the second state, and separating said remanent water content from the oil, and recovering the separated oil in a tertiary oil stream.

* * * * *